US006612334B2

(12) United States Patent
Korpanty et al.

(10) Patent No.: US 6,612,334 B2
(45) Date of Patent: Sep. 2, 2003

(54) GAS SHUTOFF VALVE HAVING A POSITIVE OPEN INDICATOR

(75) Inventors: Daniel C. Korpanty, Clarence, NY (US); Christopher Lanza, Cheektowaga, NY (US); Oliver Berry, Holland, NY (US); William D. Siska, Jr., Elma, NY (US)

(73) Assignee: Carleton Technologies, Inc., Orchard Park, NY (US)

(*) Notice: Subject to any disclaimer, the term of this patent is extended or adjusted under 35 U.S.C. 154(b) by 37 days.

(21) Appl. No.: 10/020,378

(22) Filed: Dec. 13, 2001

(65) Prior Publication Data

US 2003/0111116 A1 Jun. 19, 2003

(51) Int. Cl.[7] ........ F16K 37/00
(52) U.S. Cl. ........ 137/554
(58) Field of Search ........ 137/553, 554

(56) References Cited

U.S. PATENT DOCUMENTS 3,994,255 A 11/1976 Thompson
4,046,364 A 9/1977 Coope et al.
4,518,008 A 5/1985 Fenster et al.
4,625,758 A 12/1986 Murray
4,665,386 A 5/1987 Haws
4,721,131 A 1/1988 Ciordinik et al.
4,809,742 A 3/1989 Grau
4,988,078 A 1/1991 Otteman
5,156,185 A * 10/1992 Lester ........ 137/554
5,277,223 A 1/1994 Glockner et al.
6,481,460 B2 * 11/2002 Fukano et al. ........ 137/554

* cited by examiner

*Primary Examiner*—Kevin Lee
(74) *Attorney, Agent, or Firm*—Christopher E. Blank, Esq.; Jaeckle Fleischmann & Mugel, LLP

(57) ABSTRACT

An improved manually-operable outlet valve for a tank of pressurized gas, especially a tank in a pressurized breathing oxygen system in an aircraft. The valve has a valve body conventionally attachable to a standard oxygen tank. A rotatable valve stem is disposed within a threaded port in the valve body to open and close a poppet valve that mates with a seat machined in the valve body. A torque limiter comprising a stack of Belville washers is disposed between the valve stem and the poppet to prevent over-torque of the valve upon closing of the poppet against the seat. A collar surrounds the stem and rides axially with the valve stem during actuation of the valve. A lever and an electrical microswitch are mounted on the valve body. The collar intercepts and actuates the lever during axial travel of the collar, and the lever actuates the microswitch from an open to closed position or the reverse, the switch being in a first state at one extreme of collar travel and in the opposite state at the opposite extreme of collar travel. The microswitch is attached to an electrical connector for connection to a circuit including an annunciator in the cockpit of the aircraft, the microswitch and annunciator being wired such that the annunciator preferably is energized when the valve is open.

15 Claims, 4 Drawing Sheets

GAS SHUTOFF VALVE HAVING A POSITIVE OPEN INDICATOR

TECHNICAL FIELD

The present invention relates to shutoff valves for gas storage containers; more particularly, to such valves for storage of oxygen for emergency breathing aboard aircraft; and most particularly, to such a valve having an electric-powered indicator for showing whether the valve is open or closed independent of the pressure behind the valve.

BACKGROUND OF THE INVENTION

Oxygen gas is routinely available for emergency or high-altitude breathing by passengers on aircraft. Typically, oxygen is stored at high pressure in storage tanks mounted remotely in the aircraft from intended points of use. Each tank has a manually-operable outlet valve which is connected by tubing to a respirator or other breathing device at each point of use. Prior to designated periods, such as during flight, the tank valve is placed in the open position by unscrewing the valve stem to retract the poppet from the valve seat so that oxygen is immediately available where needed simply by actuating a respirator. In the prior art, an annunciator, typically a status light located in the cockpit of the aircraft, is connected to a pressure sensor opening into the tubing to indicate that the tubing and respirator(s) are pressurized and ready for service.

In the prior art arrangement, one must infer from a positive pressure indication by the annunciator that the tank valve is open; there is no redundant indicator on the tank valve itself. Experience has shown, however, that it is possible to trap pressure in the tubing if the tank valve is opened and then reclosed, as may occur during preflight operations, thus giving a false positive indication that a flow of oxygen is available on demand. In many aircraft, the tank itself is not accessible to persons on board the aircraft during flight, so such an error is highly dangerous. It is believed that a recent notorious flying fatality was caused by this or a closely-related scenario.

U.S. Pat. No. 4,518,008 discloses a supervisory electrical switch mounted on a quarter-turn hand valve to indicate that the valve is open. The switch is activated by a cam mounted on the valve stem and rotatable therewith. This mechanism is not suitable for use on a multi-turn hand valve such as is used on oxygen tanks.

U.S. Pat. No. 4,721,131 discloses a supervisory optical switch for indicating a hand valve is open. The switch is activated by a lever that is moved by a follower driven axially of the valve by the valve stem. This mechanism is not suited to an electrical annunciation system such as is commonly used on aircraft.

U.S. Pat. No. 4,665,386 discloses a valve position-annuciating device wherein an auxiliary knob disposed on the valve-opening knob carries a permanent magnet to operate a position-sensitive magnetic switch. This mechanism requires a critical positioning of the magnet with respect to the switch.

U.S. Pat. No. 5,277,223 discloses a valve position transmitter than shows continuously the position or degree of openness of a valve.

U.S. Pat. No. 4,046,364 discloses a torque limiter including a sprag clutch for limiting the force of the threadedly moveable jaw of a vise.

U.S. Pat. No. 4,988,078 discloses a poppet valve having a seat machined into a body element.

What is needed is a direct and positive annunciation of the position, open or closed, of the tank valve on an oxygen tank for breathing in an aircraft.

In addition, what is needed is a simplified valve having fewer parts and a stem torque limiter, thus reducing manufacturing cost, improving reliability, and reducing the potential for valve seat damage.

It is the primary object of the invention to provide an improved aircraft safety system wherein the open position of a remotely located improved and simplified aircraft oxygen tank valve can be assured in the cockpit prior to takeoff.

SUMMARY OF THE INVENTION

The invention is directed to an improved manually-operable outlet valve for a tank of pressurized gas, especially a tank in a pressurized breathing oxygen system in an aircraft. The valve has a valve body conventionally attachable to a standard oxygen tank. A rotatable valve stem is conventionally disposed within a threaded port in the valve body to open and close a poppet valve therein. The poppet mates with a seat machined in the valve body to effect an openable and closable valve seal therein. The poppet is provided with a torque limiter comprising a stack of Belville washers disposed on the valve stem. A lever and an electrical microswitch are mounted on the valve body. The valve stem is provided with a handle, for grasping as by an operator to open and close the valve, and a collar surrounding the stem for riding axially with the valve stem during actuation of the valve. The collar intercepts and actuates the lever during axial travel of the collar, and the lever actuates the microswitch from an open to closed position or the reverse, the switch being in a first state at one extreme of collar travel and in the opposite state at the opposite extreme of collar travel. The microswitch is attached to an electrical connector for connection to a circuit including an annunciator in the cockpit of the aircraft, the microswitch and annunciator preferably being wired such that the annunciator is illuminated when the valve is open.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
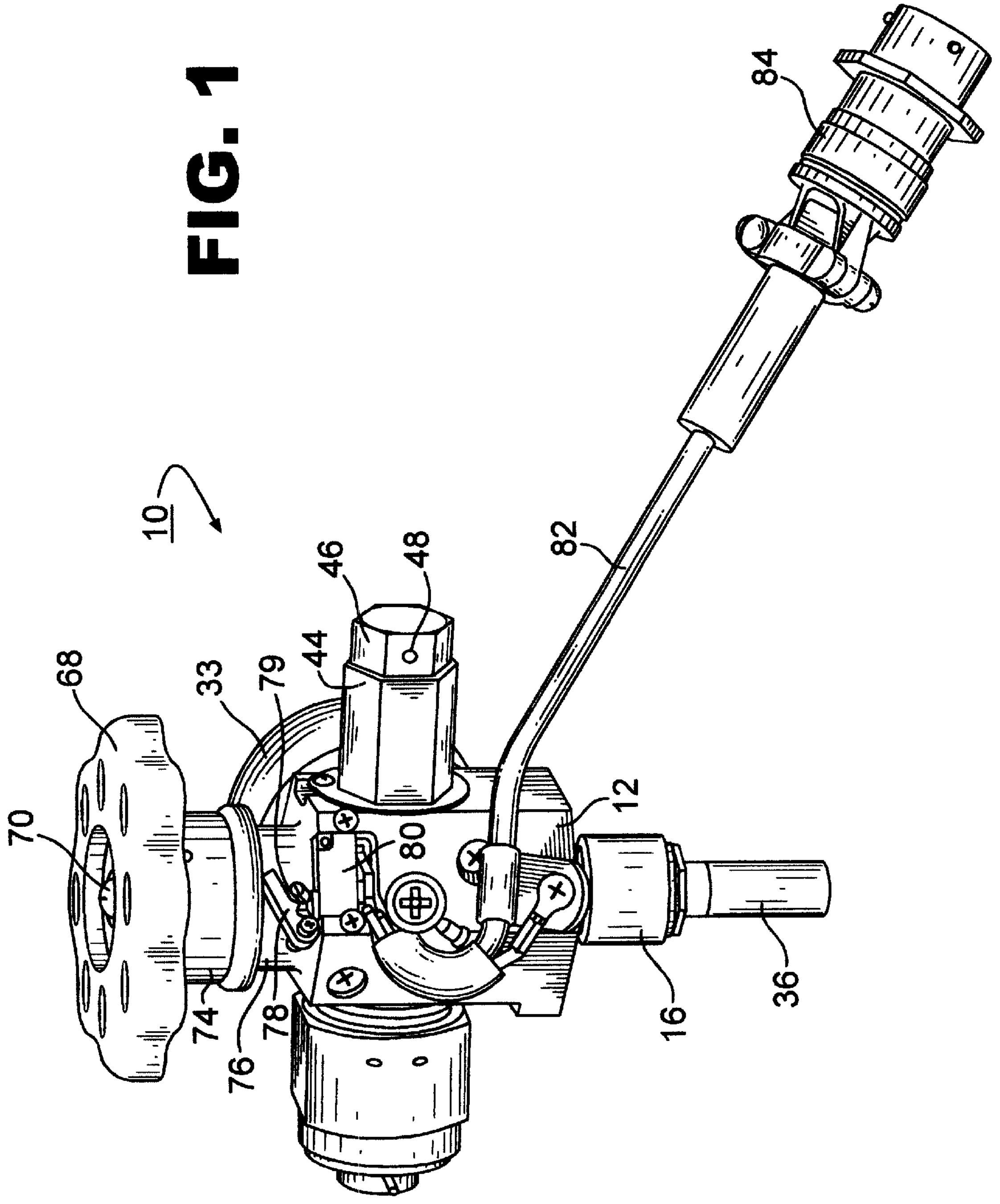
FIG. 1 is an elevational view of a gas shutoff valve having an open indicator in accordance with the invention.

Referring to FIGS. 1 through 4, an improved gas shutoff valve assembly 10 for a compressed gas storage tank includes generally a valve body 12 having a first bore 14 for admitting and releasing gas from a storage tank (not shown), typically a high pressure cylindrical vessel. Body 12 includes a first boss 16 and annular groove 18 axially surrounding bore 14 for receiving a captive nut (not shown) for securing the valve conventionally to the threaded neck of a storage tank.

Figure 2:
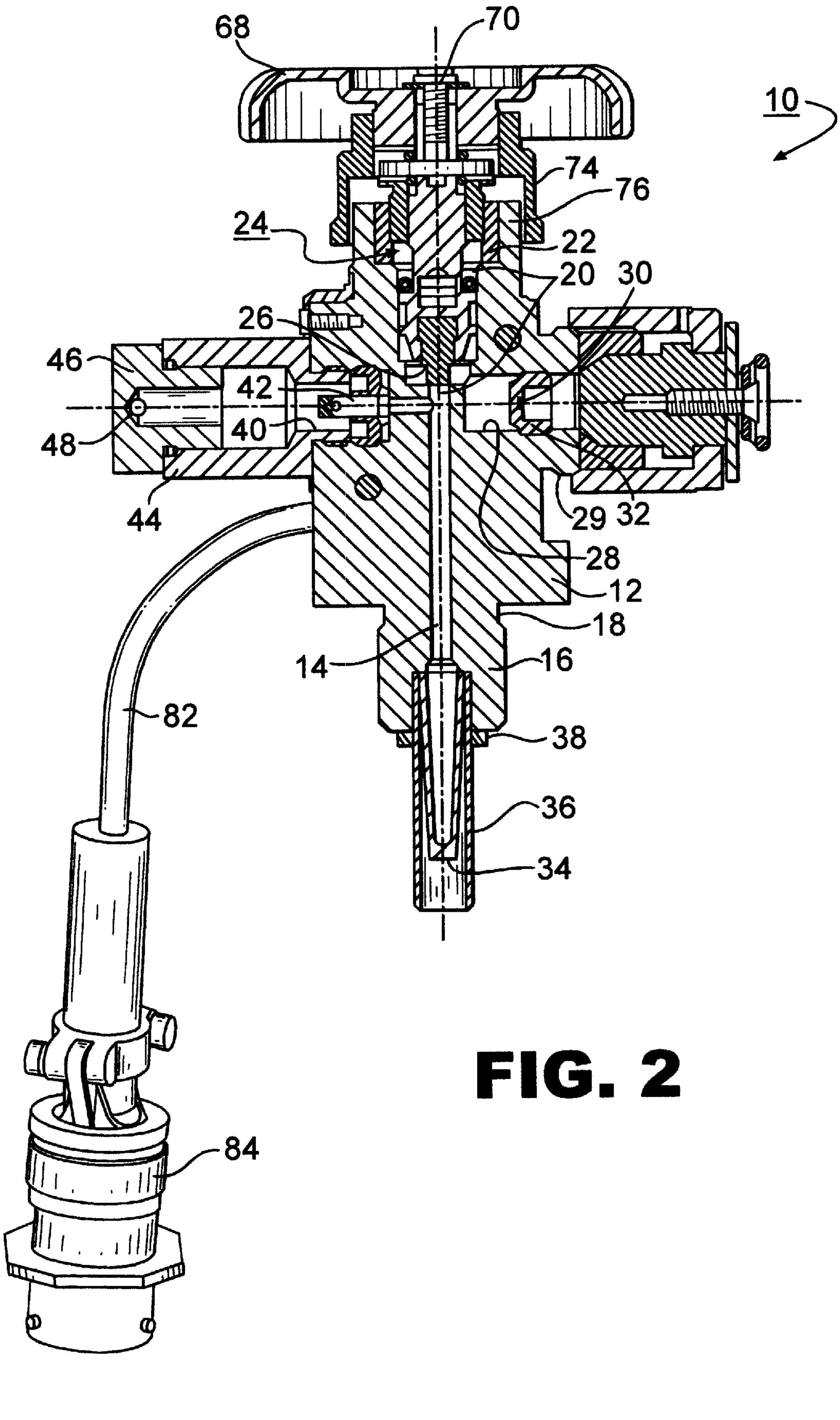
FIG. 2 is an elevational cross-sectional view of the valve shown in FIG. 1.
Figure 3:
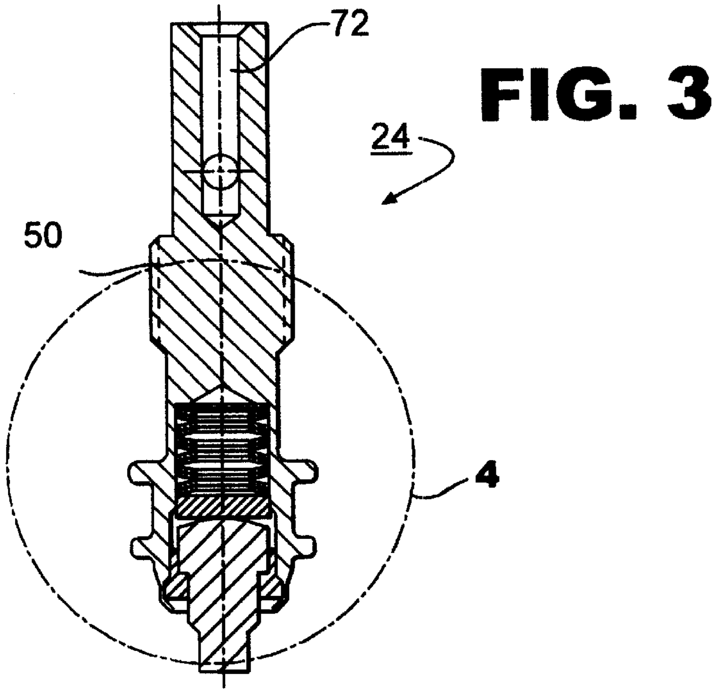
FIG. 3 is an elevational cross-sectional view of a valve stem and poppet including a torque limiting mechanism therebetween.

Opposite to and coaxial with bore 14 is a second bore 20 having an annular insert 22 disposed therein for conventionally receiving a threaded valve stem assembly 24. A conical metal poppet valve seat 26 is machined into the interior end of bore 20 at the juncture between bores 14 and 20, as shown in FIG. 2, for receiving stem assembly 24 to form a conventional poppet valve. A third bore 28 in valve body 12 extends through a external-threaded second boss 29 and is orthogonal to and intersects second bore 20 for flow of gas through the valve when stem assembly 24 is not seated on seat 26. Third bore 28 is the outlet/fill port for the valve and preferably is provided with a filter 30, for example, a sintered bronze filter, supported by a retainer 32 for filtering gas being charged into a storage tank. Similarly, first bore 14 is the tank inlet/outlet port and is preferably provided with a conical filter 34 disposed in a protective inlet/outlet tube 36 secured to boss 16 by nut 38.

A fourth bore 40 in body 12 intersects first bore 14 and contains a burst disc assembly 42 retained in bore 40 by a threaded fitting 44 receivable of a threaded dust cap 46 having at least one relief port 48. The burst disc assembly is to relieve abnormaly high pressure, as may occur accidentally during filling of the storage tank, before the tank itself can rupture. Typically, a suitable burst disc assembly may have a bursting limit of between about 2560 psig and 3080 psig.

A fifth bore (not shown in FIG. 2) intersects first bore 14 and communicates with a pressure gauge 33, shown in FIG. 1, mounted on valve body 12 for indicating the internal pressure in the storage tank at all times.

Figure 4:
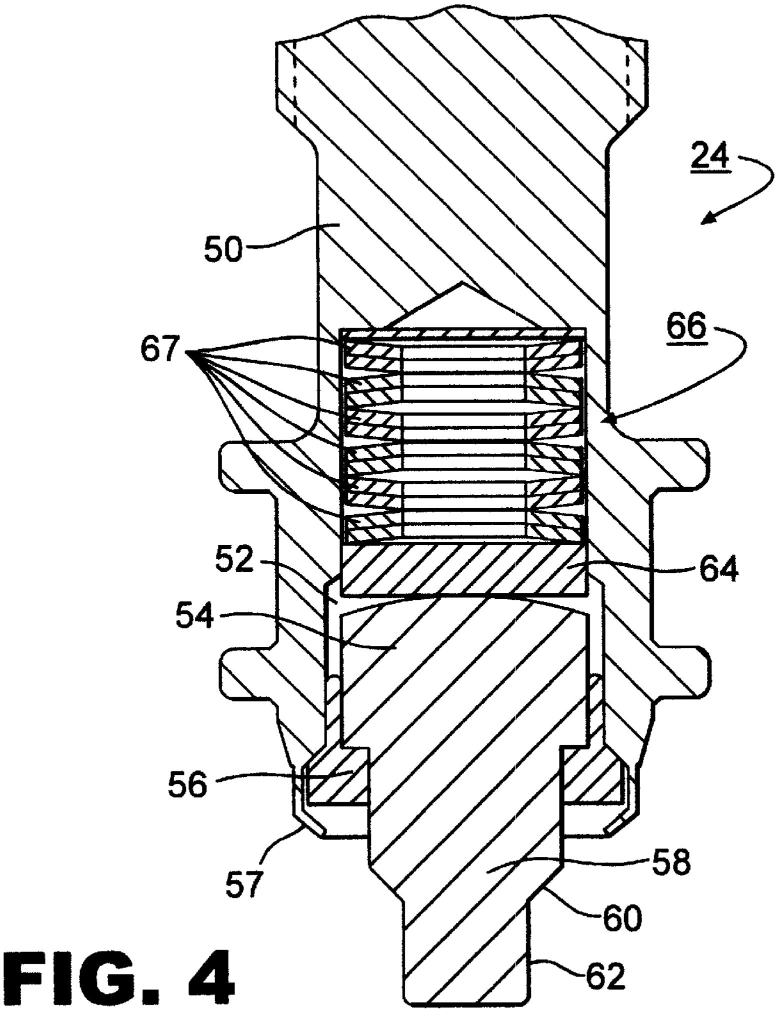
FIG. 4 is an enlarged, detailed cross-sectional view of the area delimited by circle 4 in FIG. 3.

Valve stem assembly 24 includes a valve stem 50 having a stepped axial well 52 receivable of a valve poppet 54. A retainer 56 is threaded into well 52 to retain poppet 54, and preferably a skirt portion 57 of stem 50 is rolled or crimped inward as shown in FIG. 4 to lock the retainer in position. Poppet 54 is preferably formed of metal and includes a valve head portion 58 protruding from skirt portion 57 and has a beveled face 60 and a cylindrical portion 62 for mating with valve seat 26 to form a metal-to-metal valve seal. Preferably, when installed in valve body 12, cylindrical portion 62 extends a distance into first bore 14, as shown in FIG. 2, such that valve assembly 10 is desirably a "slow opening" valve.

Slidably disposed within well 52 is a piston 64 for receiving force from poppet 54 and transmitting such force to a torque limiting spring 66. Spring 66 may be a compressed coil spring and is preferably at least one, and preferably a plurality of, Belville washers 67 which provide axial resilience for piston 64. In closing of the valve, when valve head 58 mates with seat 26, further closing torque applied to stem assembly 24 causes compression and rotation of torque limiting spring 66 without exerting further axial force on the valve seat, thus preventing damage to the seat and valve head by over-torque.

Figure 5:
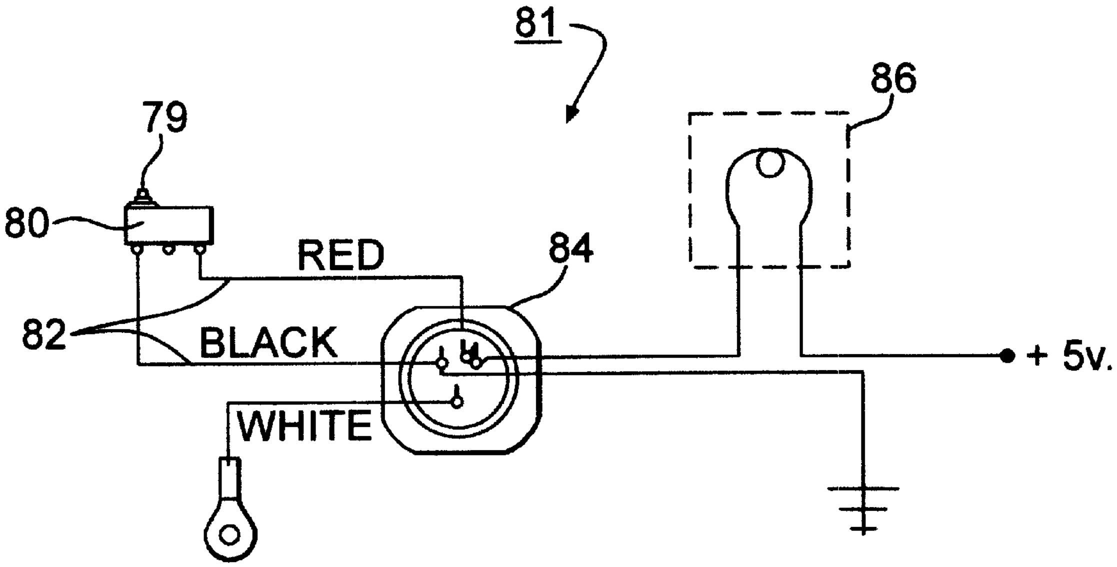
FIG. 5 is a schematic drawing of an electrical circuit suitable for use in accordance with the invention.

Valve stem assembly 24 is provided with a hand knob 68 that is connected to assembly 24 as by bolting with bolt 70 into a threaded bore 72 in stem 50. Rotation of knob 68 causes stem assembly 24 to move axially of valve body 12, inwards to close the valve and outwards to open the valve. Attached to knob 68 and rotatable therewith is a generally cylindrical actuator collar 74 extending over the outer surface of a third boss 76 on valve body 12. Collar 74 moves axially along boss 76 as a follower of the axial movement of assembly 24. A lever 78 is pivotably pinned to boss 76 in a position such that the lever is intercepted by collar 74 during the axial movement thereof. Adjacent lever 78, an electric microswitch 80 is mounted on valve body 12. Switch 80 is preferably a normally closed switch having a spring-biased trigger 79 and is connected via cable 82 to a standard CGA-540 outlet fitting 84. Switch 80 is connected to an annunciator 86, preferably a status light, which may be displayed remotely from valve assembly 10, for example, in the cockpit of an aircraft. A suitable circuit 81 for switch 80 is shown in FIG. 5.

In operation, first boss 16 of valve assembly 10 is threaded conventionally onto the neck of a gas storage tank. Hand knob 68 is rotated counterclockwise to open the valve fully. Valve assembly 10 is connected via second boss 29 to a source of pressurized gas, and the storage tank is charged to a predetermined pressure lower than the burst pressure of burst disc assembly 42. Hand knob 68 is then rotated clockwise until the valve is fully closed, capturing the charge of gas within the tank. The internal pressure in the tank may then be read from pressure gauge 33. As knob 68 is rotated clockwise, valve stem assembly 24 is moved axially inwards of valve body 12, and actuator collar 74 follows axially along the outside of third boss 76, engaging lever 78. Continued axial travel of collar 74 causes lever 78 to engage and then depress trigger 79 on microswitch 80, opening circuit 81. When it is desired to place the storage tank in service and make the stored gas available, the valve is connected into the gas distribution system and the switch is electrically connected to the annunciator. Knob 68 is rotated counterclockwise to open the valve and move collar 74 outwards releasing lever 78 and trigger 79, allowing normally-closed switch 80 to close spontaneously and complete circuit 81, causing annunciator 86 to show positively that the tank valve is fully open. Of course, it will be obvious to one of ordinary skill in the art that the switch and corresponding circuit can be selected to energize the annunciator when the valve is fully closed, if so desired; or to include a circuit and bi-functional annunciator indicative of the valve being either fully open or fully closed.

It is a feature of the invention that axial travel of the valve stem is the means for actuating the annunciator.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A gas shutoff valve for a gas storage tank, the valve having positive indication that the valve is in the open position, comprising:

a) a valve body having means for attachment to said tank;

b) a first bore in said body extending through said means for attachment into communication with the interior of said tank;

c) a second bore in said body terminating in an integral seat and communicating with said first bore;

d) a third bore in said body communicating between said second bore and the exterior of said tank;

e) a valve stem assembly axially movable within said second bore to open and close said valve, said assembly including a torque limiter;

f) means for following said axial motion of said valve stem assembly;

g) switch means disposed on said valve body and responsive to said following means for sending a signal indicative of a predetermined axial position of said valve stem assembly.

2. A valve in accordance with claim 1 wherein said valve stem assembly comprises:

a) a valve stem having a well;

b) a poppet disposed in said well and having a valve head for mating with said valve seat; and c) means for limiting torque transfer between said valve stem and said poppet.

3. A valve in accordance with claim 2 wherein said means for limiting torque transfer includes at least one Belville washer disposed between said poppet and said valve stem.

4. A valve in accordance with claim 1 wherein said valve stem is attached to a hand knob for rotation thereof, and wherein said following means is attached to said knob.

5. A valve in accordance with claim 1 wherein said switch means includes an electric switch mounted on said valve body.

6. A valve in accordance with claim 5 wherein said switch means further includes a lever pivotably mounted on said valve between said electric switch and said means for following.

7. A valve in accordance with claim 1 wherein said predetermined axial position corresponds to a fully open condition of said valve.

8. A valve in accordance with claim 1 further comprising means for filtering gas passing through said valve into said storage tank.

9. A valve in accordance with claim 1 further comprising means for filtering gas passing through said valve out of said storage tank.

10. A valve in accordance with claim 1 further comprising means for measuring and displaying gas pressure within said storage tank.

11. A valve in accordance with claim 1 further comprising rupture means for preventing over-pressurizing of said storage tank.

12. A system for indicating an open condition of a hand valve for a gas storage tank, comprising:

a) a gas shutoff valve having a valve body and valve stem axially movable within a bore in said body to open and close a valve seal therein;

b) means for following said axial motion of said valve stem;

c) switch means disposed on said valve body and responsive to said following means for sending a signal indicative of a predetermined axial position of said valve stem assembly; and d) indicator means connected in an electrical circuit with said switch means and responsive to said signal.

13. A system in accordance with claim 12 wherein said indicator means includes an annunciator.

14. A system in accordance with claim 13 wherein said annunciator includes an indicator light.

15. A system in accordance with claim 12 wherein said indicator means is remote from said switch means.

* * * * *